(12) United States Patent
Udagawa et al.

(10) Patent No.: US 7,367,566 B2
(45) Date of Patent: May 6, 2008

(54) METAL GASKET

(75) Inventors: Tsunekazu Udagawa, Ichikawa (JP); Yoshio Miyaoh, Utsunomiya (JP)

(73) Assignee: Ishikawa Gasket Co., Ltd., Tokyo (JP)

( * ) Notice: Subject to any disclaimer, the term of this patent is extended or adjusted under 35 U.S.C. 154(b) by 182 days.

(21) Appl. No.: 11/269,605

(22) Filed: Nov. 9, 2005

(65) Prior Publication Data

US 2006/0097460 A1    May 11, 2006

(30) Foreign Application Priority Data

Nov. 10, 2004   (JP)   .............................. 2004-326370

(51) Int. Cl.
   *F02F 11/00*   (2006.01)
(52) U.S. Cl. ........................ 277/593; 277/594; 277/595
(58) Field of Classification Search ......... 277/592–598
   See application file for complete search history.

(56) References Cited

U.S. PATENT DOCUMENTS

| | | | | |
|---|---|---|---|---|
| 6,036,195 A | * | 3/2000 | Udagawa | ..................... 277/595 |
| 2003/0062691 A1 | * | 4/2003 | Diez et al. | .................. 277/590 |

* cited by examiner

*Primary Examiner*—Vishal Patel
(74) *Attorney, Agent, or Firm*—Manabu Kanesaka

(57) ABSTRACT

A metal gasket for sealing multiple cylinder bores includes one or more metal substrates, main sealing beads around each of the cylinder bores, and one or more sub-beads. The main sealing beads include meandering portions located in a sealing portion between the cylinder bores, and the sub-bead is provided between the meandering portions. By placing the sub-bead between the main bead meandering portions, the base portion of the meandering portion and the base portion of the sub-bead squeeze each other. As a result, the lower portion of the meandering portion can be prevented from slipping, and the surface pressure can be partially reinforced. The metal gasket provides an excellent seal in a location where surface pressure is often partially reduced.

11 Claims, 4 Drawing Sheets

METAL GASKET

BACKGROUND OF THE INVENTION AND RELATED ART STATEMENT

The present invention relates to a metal gasket to be installed between two engine members, such as a cylinder head and a cylinder block of an engine, to seal the area there between.

The cylinder head gasket is tightened by head bolts once the cylinder head gasket is installed between the cylinder head and the cylinder block (cylinder body) of an automobile engine (internal combustion engine). The cylinder head gasket serves to seal fluids such as combustion gas, oil, coolant water, and so on.

Recently, as a means of reducing the weight of engines, engine materials have been aluminum-alloyed or otherwise reduced in weight so that low rigidity of the engine is rapidly resulting. As a result, in terms of the sealing condition of a modern head gasket for a multi-cylindered engine, there is a tendency toward increasing failures due to local combustion gas leak. A main reason for the aforementioned failures is either the local low rigidity of the engine, or the increase in uneven temperature distribution.

Specifically, with the low rigidity of the engine or the increase of uneven temperature distribution, when the gasket is tightened, the unevenness of sealing surface pressure around the cylinder bore becomes large. Thus, the difference between portions where the surface pressure is high, and portions where the surface pressure is low, becomes large. Accordingly, gas leaks occur from portions where the surface pressure is low.

There are two main methods of solving a gas leak between cylinder bores. One method is improving the poor sealing condition of the corresponding part of the engine side. Another method is providing a gasket structure which can provide an adequate seal even under poor sealing conditions.

To solve the above-mentioned gas leak on the gasket side, conventionally, the total surface pressure of the sealing portion around the cylinder bore (combustion chamber) was increased, or, material with an elastic capability was used for a bead in order to reinforce the partially decreased surface pressure due to flexure and so on. Also, a reinforcing plate such as a shim or a comparable structure has been widely used.

At the same time, technology in which the sealing performance around the cylinder bore or the other sealing bores of the metal gasket is improved by a waveform bead (meandering bead) whose shape when viewed from a plan view is waved, is well-known. See, for example, Japanese Patent No. 3057445.

It is possible that the aforementioned meandering bead technology is applied between the cylinder bores, and that the meandering portion, where the main sealing bead meanders (i.e., meanders in a horizontal direction in a plan view), is disposed between the cylinder bores.

When a metal gasket with the above-described structure is used in a situation where the space between the cylinder bores is narrow, beads sealing adjacent cylinder bores are located close to each other. Accordingly, when the gasket is tightened, lower portions of the abutting beads contact each other and squeeze together. As a result, the lower portions of the beads become resistant to slippage resulting from repeated movement in the vertical direction of an engine member, such as the cylinder head and so on, which occurs during engine operation, even if there is bashing. Therefore, an appropriate sealing surface pressure can be maintained.

However, in the case of an engine which has a wider space between adjacent cylinder bores, the distance between meandering portions of the main bead widens, and a large gap is produced between both meandering portions. Due to the gap, maintaining the surface pressure becomes difficult. At the same time, when repeated motions in the vertical direction of the cylinder head occur during engine operation, the lower portions of the beads of the meandering portions gradually slip in a gap direction. Accordingly, the amount of creep (creep relaxation) of the beads becomes large. As a result, the sealing performance deteriorates.

The present invention was developed to solve the aforementioned problems associated with conventional metal gaskets. An object of the invention, therefore, is to provide a metal gasket capable to provide partially surface-pressure reinforcing measures in the outer portion of the main bead between the adjacent cylinder bores, and thus achieve excellent sealing performance relative to the cylinder bore.

Further objects and advantages of the invention will be apparent from the following description of the invention.

SUMMARY OF THE INVENTION

To attain the aforementioned object, a metal gasket according to the present invention is configured as follows.

In a first embodiment of the metal gasket, in any of the metal substrates of a cylinder head gasket for a multi-cylindered engine having a single metal substrate or multiple metal substrates, a main bead provided around a cylinder bore is formed with a meandering portion in a sealing portion between cylinder bores. The cylinder head gasket also includes one or more sub-beads having a full bead between the meandering portions abutting between the cylinder bores.

In one embodiment of the cylinder head gasket for the multi-cylindered engine having multiple metal substrates, the main bead provided around the cylinder bore of one metal substrate is formed with the meandering portion in the sealing portion between the cylinder bores. In addition, the cylinder head gasket includes one or more sub-beads having a full bead in an opposed portion between the meandering portions between the cylinder bores of another metal substrate.

In addition, in the aforementioned embodiment of the metal gasket, both metal substrates are abutted and laminated to each other in such a way that a projection of the main bead and a projection of the sub-bead are opposed each other.

In another embodiment of the invention, another sub-bead which is different from the main bead is placed in an outer portion of the main bead between the cylinder bores which are relatively wide, i.e., between the meandering portions. Accordingly, when the main bead is compressed, the base portion of the main bead of the meandering portion and the base portion of the sub-bead squeeze each other so that the lower portions of the beads of the meandering portions can be prevented from slipping.

As a result, the beads of the meandering portions cannot be easily crushed, so that the compressive resistance significantly increases more than that of a structure having only the main bead. Therefore, the surface pressure can be partially reinforced corresponding to a partial decline in the surface pressure between the cylinder bores.

The sub-bead may be single or multiple, and may be an ordinary straight full bead or a simple-curve full bead, or a meandering bead. The type of sub-bead to be used is determined and then placed according to the particular situation, such as the required sealing surface pressure and so on. However, when the meandering portion is formed in more than one of the sub-beads, even in the case of a wide distance between the cylinder bores, appropriate sealing can be achieved by a small number of sub-beads.

Also, in the metal gasket, the shape of the meandering portion of the sub-bead may be different from that of the meandering portion of the main bead. Furthermore, the size of the wave of the meandering portion of the sub-bead may be made smaller than the wave of the meandering portion of the main bead, or at least one of the height, width, shape of cross section of the bead of the sub-bead may be formed different from those of the meandering portion of the main bead. As a result, sealing surface pressure can be achieved more easily.

According to the metal gasket of the present invention, the sub-bead is placed in the outer portion of the main bead between abutting cylinder bores, i.e., between the meandering portions so that the base portion of the main bead of the meandering portion and the base portion of the sub-bead squeeze each other. As a result, the lower portion of the bead of the meandering portion can be prevented from slipping, and the surface pressure can be partially reinforced corresponding to a partial decline in the surface pressure between the cylinder bores.

Therefore, with the metal gasket according to the present invention, excellent sealing performance relative to the cylinder bores can be attained.

DETAILED DESCRIPTION OF THE PREFERRED EMBODIMENTS

In the following description, embodiments of a metal gasket according to the present invention are explained with reference to the drawings. FIGS. 1-8 are explanatory-type drawings (i.e., not to scale), and structures are exaggeratedly shown by different sizes of cylinder bores, beads, meandering beads, and so on that depart from actual sizes, so that the drawings of the structures are easily understood.

The metal gasket according to the present invention is a cylinder head gasket to be installed between a cylinder head and a cylinder block (cylinder body) of an engine. The metal gasket seals the high-temperature and high-pressure combustion gas of the cylinder bores, and seals fluids such as coolant water or oil and so on in coolant-water channels or coolant-oil channels.

Figure 1:
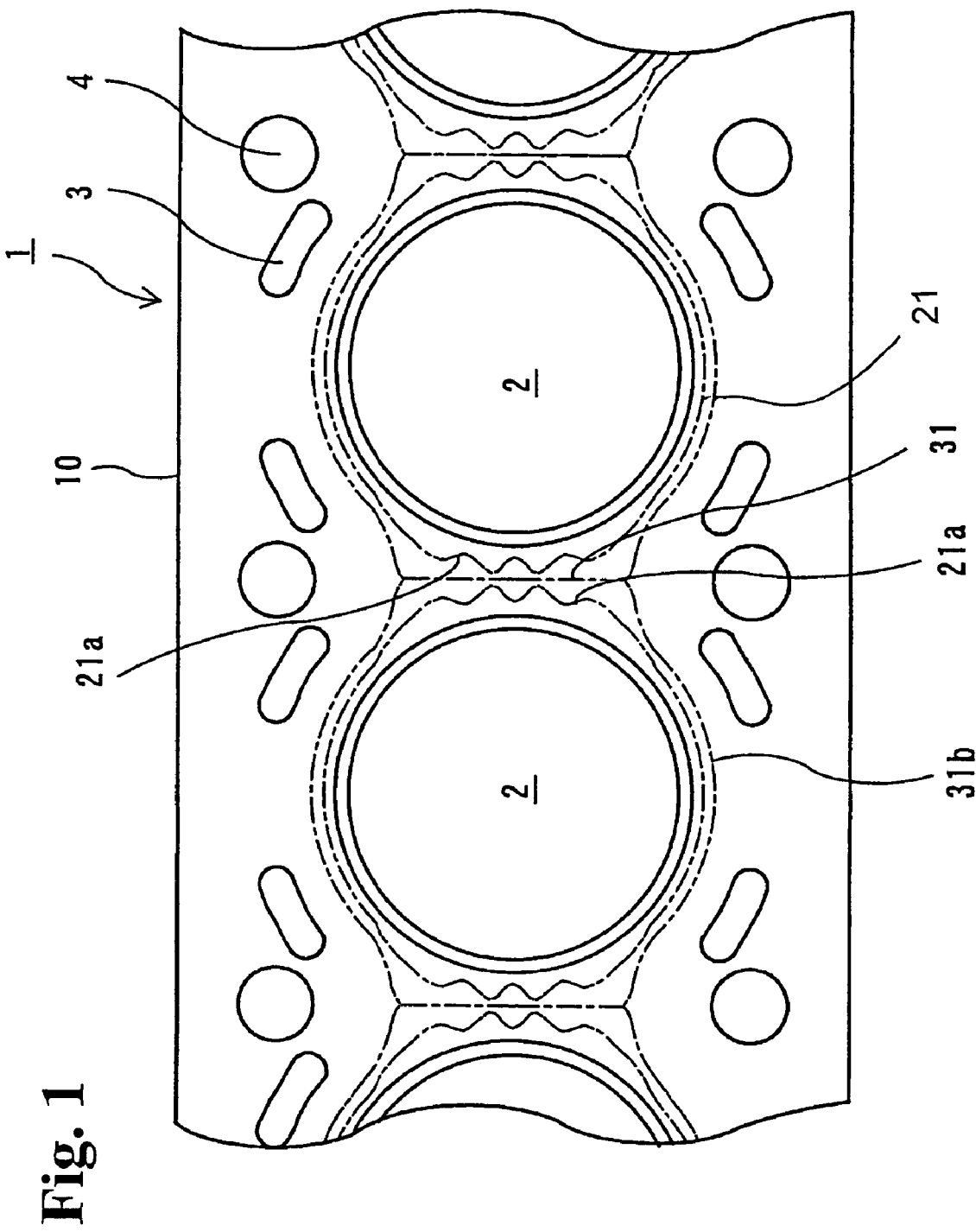
FIG. 1 is a plan view showing a metal gasket according to a first embodiment of the present invention.

The metal gasket includes a single metal substrate (metal plate) or multiple metal substrates, formed from a mild steel plate, stainless-annealing material (anneal material), stainless-thermal refining material (spring-steel plate) and so on. Also, the metal gasket is prepared by accounting for the shapes of the engine members, such as the cylinder block and so on. As shown in FIG. 1, cylinder bores (combustion-chamber bores) 2, liquid bores 3 for circulating coolant water or engine oil, and head-bolt bores 4 for tightening a head bolt, are included.

Figure 2:
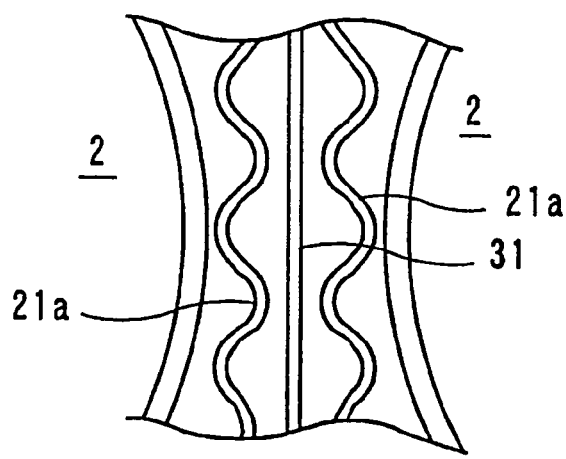
FIG. 2 is a partial plan view showing the metal gasket according to the first embodiment of the present invention.
Figure 3:
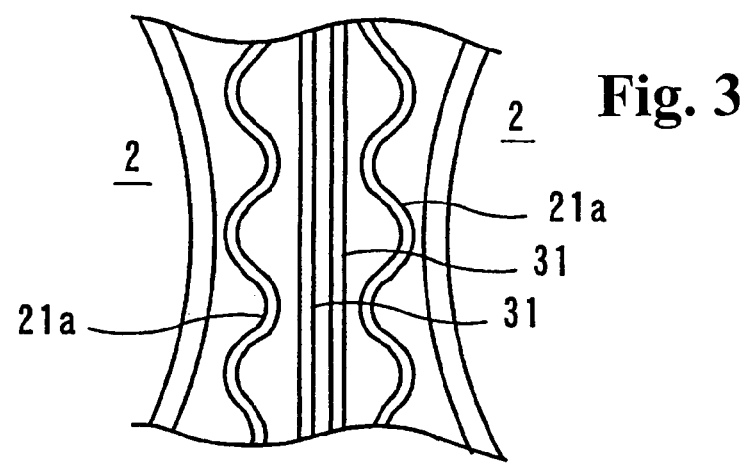
FIG. 3 is a partial plan view showing the metal gasket and associated structure according to the first embodiment of the present invention.

A metal gasket 1 according to a first embodiment of the invention is shown in FIGS. 1-3. The metal gasket includes a metal substrate 10 composing a cylinder head gasket 1 for a multi-cylindered engine. In the metal gasket 1, main beads 21 provided with full beads around the cylinder bores 2 are formed, and meander at sealing portions which are located between the cylinder bores 2. At the same time, sub-beads 31 are disposed and formed with full beads between meandering portions 21a abutting between the cylinder bores 2. In FIGS. 1 and 2, one sub-bead 31 is provided in a straight line. In FIG. 3, two sub-beads 31 are provided in a straight line.

According to the above-described embodiments, the sub-beads 31 are disposed in the outer portions of the meandering portions (wave portions) 21a of the main beads 21, i.e., between the abutting meandering portions 21a relative to the structure of the gasket which is wide between the cylinder bores of the engine. Accordingly, when the main beads 21 are compressed, the compressive resistance increases due to the sub-beads 31 more than the structure consisting of only the main beads 21. As a result, surface pressure can be partially reinforced corresponding to a partial decline in the surface pressure between the cylinder bores. Therefore, excellent sealing performance relative to the cylinder bores can be attained.

Also, in the case of an enormously wide distance between two cylinder bores of an engine, the surface pressure can be reinforced by increasing the number of the sub-beads 31.

Figure 4:
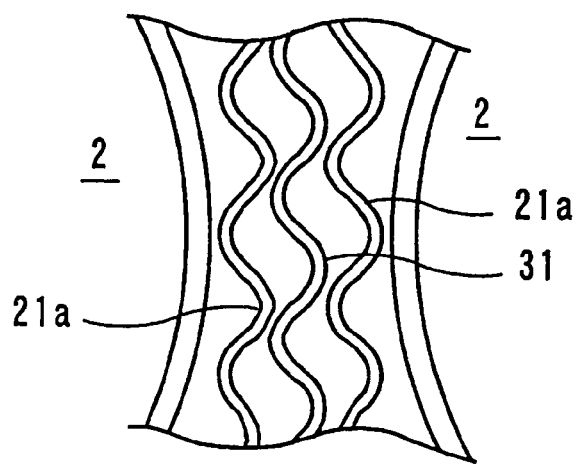
FIG. 4 is a partial plan view showing a metal gasket according to a second embodiment of the present invention.
Figure 5:
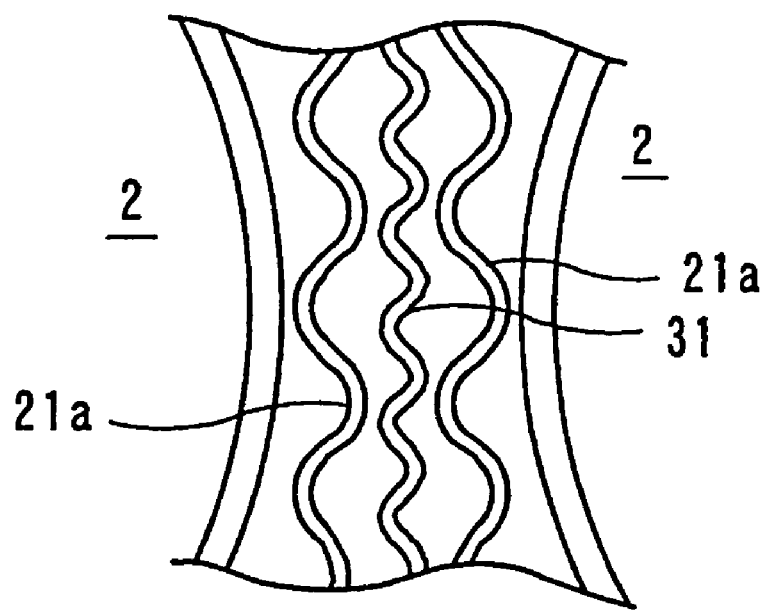
FIG. 5 is a partial plan view showing the metal gasket and associated structure according to the second embodiment of the present invention.
Figure 6:
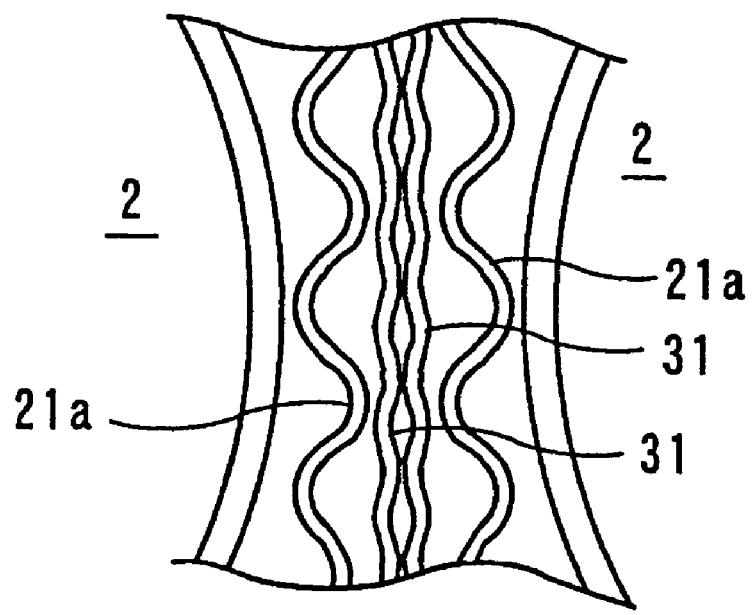
FIG. 6 is a partial plan view showing the metal gasket and associated structure according to the second embodiment of the present invention.

A metal gasket according to a second embodiment of the invention is shown in FIGS. 4-6. In the second embodiment of the invention, the sub-beads 31 provided in the metal gasket meander. In the metal gasket according to the second embodiment, the meandering portions of the sub-beads 31 may be formed in the same shape and size as the meandering portions 21a of the main beads 21. However, at least one of the height, width, and cross-sectional shape of the beads of the meandering portions of the sub-beads 31 may be formed so as to be different from those of the meandering portions 21a of the main beads 21.

According to the second embodiment, in addition to the sub-beads 31 meandering, the sizes of the waves of the meandering sub-beads 31 can be reduced, or, multiple meandering sub-beads 31 can be provided. As a result, compressive resistance can be reinforced, and creep of the main beads 21 on both sides can be prevented. The aforementioned sub-bead structures are especially suitable for a diesel engine, which presents difficult sealing conditions.

In the structure depicted in FIG. 4, one sub-bead 31 meanders so that the compressive resistance is reinforced. Also, in the structure depicted in FIG. 5, the waves of the meandering portions of the sub-bead 31 are formed to be small. In addition, in the structure depicted in FIG. 6, two sub-beads 31 with meandering portions are provided.

In the structure depicted in FIG. 5, there is one sub-bead 31. However, the waves of the meandering portions of the sub-bead 31 are smaller than the waves of the meandering portions 21a of the main beads 21 on both sides, so that the compressive resistance is reinforced even further. Accordingly, the sub-bead 31 reduces the creep (i.e., provides for creep relaxation) of the meandering portions 21a of the main beads 21 on both sides.

Referring to FIG. 6, as with the structure in FIG. 5, when the waves of the meandering of the sub-bead 31 are made small, the sub-bead 31 can be disposed even in a narrow location. As a result, this structure is suitable for service where the width between the cylinder bores is even slightly narrower than that of the structure depicted in FIG. 6.

Figure 7:
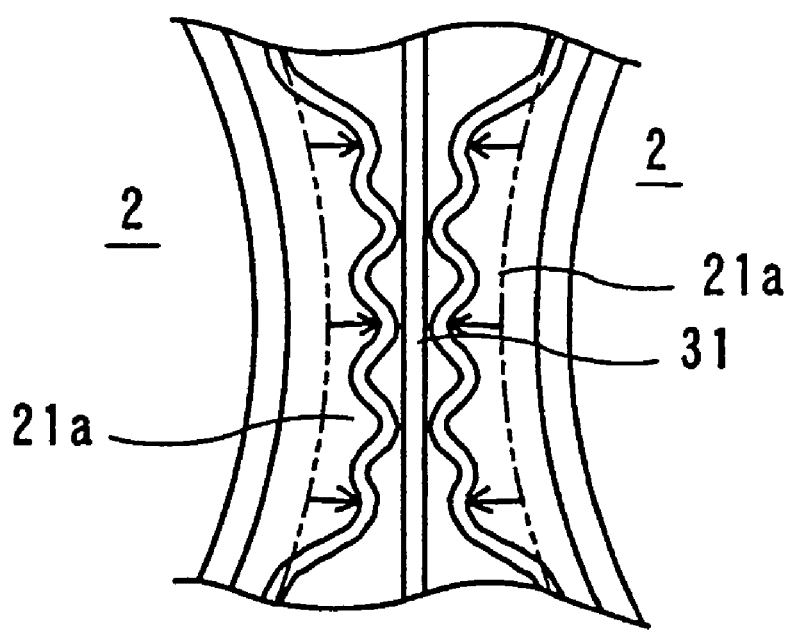
FIG. 7 is a partial plan view showing the metal gasket according to a third embodiment of the present invention.

A metal gasket according to a third embodiment of the invention is shown in FIG. 7. In the third embodiment of the invention, the meandering portions 21a of the main beads 21 in the metal gasket are pulled to an outer side relative to circumferential lines showing overall shapes of the main beads 21 only between the cylinder bores. That is, both meandering portions 21a approach each other so that the distance between the meandering portions 21a becomes narrow. At the same time, one straight sub-bead 31 is disposed, and the compressive resistance of the sealing portion between the cylinder bores is therefore modified.

As described above, when the distance between the engine cylinder bores is wide, the distance between the meandering portions 21a is wide, and multiple general sub-beads 31 must pass through the wide space. When the multiple sub-beads 31 pass through, the compressive resistance of the sealing portion between the cylinder bores is so strong that sometimes the surface-pressure balance around the cylinder bores can be severely impacted. However, by adopting the structure as shown in FIG. 7, the aforementioned problem can be avoided.

Figure 8:
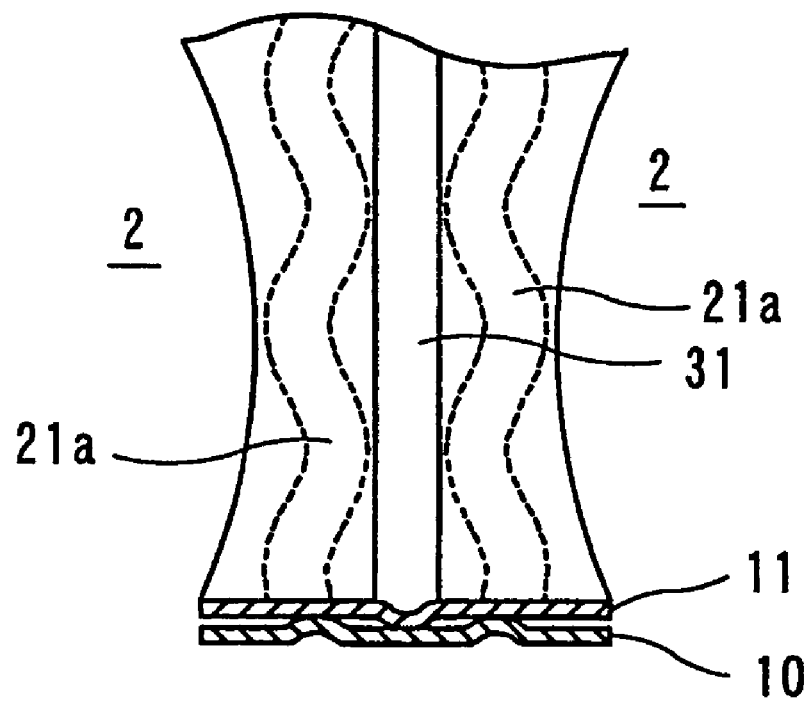
FIG. 8 is a partial plan view showing a metal gasket according to a fourth embodiment of the present invention.

A metal gasket according to a fourth embodiment of the invention is shown in FIG. 8. In the fourth embodiment of the invention, the main beads 21 are formed in the first metal substrate 10, and the sub-bead 31 is formed in another metal substrate 11. Both metal substrates 10 and 11 are combined in such a way that projections of the main beads 21 and a projection of the sub-bead 31 oppose each other so that a unified seal bead is made.

In the cylinder head gasket for the multi-cylindered engine having multiple metal substrates, the main beads 21 provided around the cylinder bores 2 of metal substrate 10 meander at the sealing portion between the cylinder bores. At the same time, one or more sub-beads 31 formed with full beads are disposed between the meandering portions 21a of the main beads 21 between the cylinder bores of the other metal substrate 11. In addition, the metal substrates 10, 11 are abutted against each other and laminated in such a way that the projections of the main beads 21 and the projections of the sub-beads 31 are opposed to each other.

According to the above-mentioned gasket structure, the sub-beads 31 are disposed in the outer portions of the meandering portions (wave portions) 21a of the main beads 21, i.e., between the meandering portions 21a relative to the structure of the gasket which is wide between the cylinder bores of the engine. Accordingly, when the main beads 21 are compressed, the base portions of the main beads of the meandering portions 21a and the base portions of the sub-beads 31 squeeze each other so that the main beads 21 are difficult to crush.

Also, the lower portions of the beads of the meandering portions can be prevented from slipping so that the compressive resistance significantly increases more than that of a structure having only the main beads 21. As a result, surface pressure can be partially reinforced corresponding to a partial decline in the surface pressure between the cylinder bores.

Also, according to the fourth embodiment of the invention, the sub-beads 31 are formed in the other metal substrate 11 so that wide options in the shape, substrate thickness, position, and so on are available.

Also, the design of the structure is not necessarily restricted by the meandering portions 21a of the main beads 21 on both sides, so that sub-beads can be freely designed. Accordingly, the gasket can be designed to bring out the best effect of the sub-beads, and therefore provide excellent sealing performance. Also, in the case of an extremely wide distance between the cylinder bores 2 of the engine, appropriate pressure reinforcement can be achieved by increasing the number of the sub-beads.

In FIG. 1, each sub-bead 31 is formed as a part of the beads 31b surrounding the cylinder bores 2 and the main beads 21, i.e., as a part of the outside of dual beads relative to the cylinder bores 2. However, the present invention is not necessarily limited to only the above-described structure. For example, each sub-bead 31 may be provided only in the sealing portion between the cylinder bores, and may not necessarily be formed as a part of the outside of the dual beads.

In addition, the structure depicted in FIGS. 1-7 can include two or more of the metal substrates, and the cylinder bores can include folded portions (grommets). Proximal outside lines (circles or circular arcs) of the cylinder bores 2 indicate outer circumferential edges of the folded portions.

While the invention has been described with reference to specific embodiments thereof, the description is illustrative, and the scope of the present invention is limited only by the appended claims.

The disclosure of Japanese Patent Application No. 2004-326370 filed on Nov. 10, 2004, is incorporated herein.

What is claimed is:

1. A metal gasket for sealing cylinder bores, said gasket comprising:
   a metal substrate;
   main sealing beads provided around each of said cylinder bores, one of said main sealing beads consisting of meandering portions, each being formed only in a sealing portion between two cylinder bores adjacent to each other, and non-meandering portions connecting the meandering portions; and
   at least one sub-bead having a full bead between one of said meandering portions and said main sealing bead of the adjacent cylinder bore.

2. A metal gasket according to claim 1, wherein said metal substrate comprises first and second metal plates laminated together, said first metal plate including said main sealing beads and said second metal plate including said at least one sub-bead.

3. A metal gasket according to claim 2, wherein said first and second metal plates are abutted and laminated to each other so that projections of said main beads and projections of said sub-beads are opposed to each other.

4. A metal gasket according to claim 1, wherein said at least one sub-bead includes meandering portions.

5. A metal gasket according to claim 4, wherein a shape of said meandering portions of said at least one sub-bead is different from a shape of said meandering portions of said main beads.

6. A metal gasket according to claim 1, wherein said meandering portions of said main sealing beads are provided so as to be close to each other by being disposed, in said sealing portions, radially outward from the circumference of said cylinder bore.

7. A metal gasket according to claim 1, wherein said main sealing beads have a height, a width, and a cross-sectional shape, and said sub-beads have a height, a width, and a cross-sectional shape, and at least one of said height, said width, and said cross-sectional shape of said main sealing beads is different from said height, said width, and said cross-sectional shape of said sub-beads.

8. A metal gasket according to claim 1, further comprising an outer bead surrounding only the cylinder bores and the main sealing beads, said at least one sub-bead extending between portions of the outer bead facing each other in the sealing portion between two cylinder bores.

9. A metal gasket for sealing cylinder bores, comprising:
a metal substrate;
main sealing beads provided in the metal substrate around said cylinder bores, first of said main sealing beads consisting of first and second meandering portions, each meandering portion being located only in a sealing portion between two cylinder bores adjacent to each other and having projections directed toward the cylinder bore adjacent thereto, and two non-meandering portions connecting the first and second meandering portions, third and forth meandering portions formed in second and third main sealing beads located adjacent to the first and second meandering portions, the projections of the first and second meandering portions being arranged symmetrical to each other relative to a center line between the two cylinder bores adjacent to each other;
at least one sub-bead having a full bead located in the center line between said first and third meandering portions or said second and forth meandering portions; and
an outer bead surrounding only the cylinder bores and the main sealing beads, said at least one sub-bead extending between portions of the outer bead facing each other in the sealing portion between the two cylinder bores.

10. A metal gasket according to claim 9, wherein two sub-beads are disposed between said first and third meandering portions or said second and forth meandering portions in the one sealing portion.

11. A metal gasket according to claim 10, wherein each meandering portion has three projections projecting toward the cylinder bore.

* * * * *